United States Patent [19]

Ritter

[11] Patent Number: 5,414,207
[45] Date of Patent: May 9, 1995

[54] METHOD FOR RENDERING WASTE SUBSTANCES HARMLESS

[76] Inventor: Robert A. Ritter, 1705 Nelson Street, No. 108, Vancouver, British Columbia, Canada, V6G 1M6

[21] Appl. No.: 229,672

[22] Filed: Apr. 19, 1994

Related U.S. Application Data

[63] Continuation-in-part of Ser. No. 866,472, Apr. 10, 1992, which is a continuation-in-part of Ser. No. 804,310, Dec. 9, 1991, Pat. No. 5,290,351.

[51] Int. Cl.⁶ .............................................. C04B 2/02
[52] U.S. Cl. .................................. 588/226; 106/244; 106/250; 106/266
[58] Field of Search .................. 106/244, 250, 266; 588/226

[56] References Cited

U.S. PATENT DOCUMENTS

| 842,212 | 1/1907 | Kyle | 106/244 |
| 4,383,783 | 5/1983 | Kruka et al. | 106/266 |

*Primary Examiner*—David Brunsman
*Attorney, Agent, or Firm*—Nixon & Vanderhye

[57] ABSTRACT

A method is provided for the treatment of hydrocarbon-contaminated soil by chemical hydrolysis and/or oxidation of the hydrocarbons in the hydrocarbon-contaminated soil. The method includes conditioning lime with a fatty acid hydrophobizing agent. The fatty acid treated lime is preheated to a temperature of about 50° C. to about 80° C. to provide conditioned lime.

21 Claims, 3 Drawing Sheets

TYPICAL REACTOR
TEMPERATURE PROFILE

TYPICAL FURNACE
TEMPERATURE PROFILE

METHOD FOR RENDERING WASTE SUBSTANCES HARMLESS

BACKGROUND OF THE INVENTION (i) Related Application

The invention is a continuation-in-part of application Ser. No. 07/866,472, filed Apr. 10, 1992, which is in turn a continuation-in-part of co-pending application Ser. No. 07/804,310, filed Dec. 9, 1991, now U.S. Pat. No. 5,290,351, the entire contents of which are incorporated herein by reference.

(ii) Field of the Invention

This invention relates to a method for the treatment of hydrocarbon-contaminated soil.

(iii) Description of the Prior Art

For some time now, the art has been faced with the problem of the treatment of hydrocarbon-contaminated soils as a result of disposal of industrial materials in soil. Common by-products of plants in which chemicals are made or treated on an industrial scale are aqueous sludge, often containing a high proportion of relatively inert fine particulate materials a variety of reactive materials in sufficiently small concentrations as to make the reclamation thereof uneconomical. Often they are merely pumped on land. The compounds in the sludge solids include common materials, e.g., sulfate ions, calcium ions, aluminum ions, and iron ions or sources thereof as well as water.

The disposition of such sludge has always been a problem. With the increasing awareness of the undesirability of discharging such waste materials into the environment and the resulting governmental regulation of such discharges, the need for a convenient, harmless, and economical way of disposing of such sludge or converting them into a useful product is becoming increasingly apparent. A further incentive is provided by the capital investment and land required for the disposition of such sludge by conventional means, which often include large settling ponds or storage piles.

Another such a problem relates to soil which may have been contaminated through intentional or accidental spills of petroleum oils, hydrocarbon solvents or other, semivolatile or non-volatile organic materials. Such contaminants may extend over large tracts of land and may directly or indirectly, e.g., through subsequent contamination of an underlying aquifer, constitute an extreme threat to wildlife, vegetation or human health. Conventional methods, e.g., land farming are not very suitable.

Yet another problem relates to oil well sumps. Oil well sumps are artificial pits used as dump sites for all kinds of liquid and viscous wastes. The physical consistency of the sump varies according to the random materials dumped. Typically, however, in the absence of a water layer, the consistency is pasty. Inasmuch as sumps create traps for wild fowl, there is an increasing demand for elimination of sumps, especially those not being commercially used. In addition, they are unsightly. The traditional treatment has been to dump and mix dirt into the sump and thereby soak up sufficient of the oil until the dirt-sump material can be moved by conventional equipment. The mixture is then spread to dry. This treatment has not been acceptable because the mixture bleeds oil and chemicals. Over months and years, this dirt-sump mixture oozes oil and becomes almost as objectionable as the original oil sump. This unsatisfactory type of treatment has called for an improved solution to the ecological problem of sump elimination.

The increasing use of hydrophobic substances, e.g., oils and oily substances, as well as macromelecular substances, has created new problems which arise mainly out of the handling of these substances. Particularly, the use of old oil, heating oils, lubricating oils and diesel fuels often leads, either intentionally or through negligence, and often due to emergency situations, to dangerous contamination of the environment.

There are a number of methods for rendering harmless such oils or oily substances which, in a single phase or in multiple phase systems, entail an endangerment of the environment. For example, oil can be chemically reacted by being burned, for example, or biologically degraded. The combustion method used frequently in combatting oil damage results in considerable air pollution if the burning is performed in the open rather than in expensive combustion apparatus.

The use of adsorbents solves such problem only when the oil can be fixed with them in such a manner that it is chemically unaltered but is encapsulated or otherwise isolated or is accessible to biological degradation and no longer constitutes any danger to the environment. With the known adsorptive agents, activated charcoal, kieselguhr or bentonite, waste oil, for example, can be adsorptively bound only with difficulty. Large amounts of oil may cement the adsorptive agent, especially in the case of high-viscosity oils, making further processing difficult.

It has furthermore been proposed in various ways to treat porous mineral substances with hydrophobic substances for the purpose of improving their adsorptive characteristics. In this manner hydrophobic waste substances can be preferentially bound, while the water is no longer primarily absorbed. In such adsorptive agents, such as hydrophobized pearlite, however, the absorptive capacity is greatly reduced, since the mineral starting material is partially sealed by surface treatment with hydrophobizing substances, so that the inner cavities are no longer accessible.

It is particularly important that the substances which are adsorptively bound by the known processes are so fixed on the adsorptive agent that they no longer constitute any danger to the environment.

In addition to the general, mainly unsatisfactory procedures for the problems of disposal of such wastes discussed above, the patent literature has purported to provide solutions to these problems. For example, one solution to the problem was said to be provided in U.S. Pat. No. 3,720,609, patented Mar. 13, 1973 by C. L. Smith et al. That patent provided a procedure whereby waste sludge containing small amounts of certain types of reactive materials were treated by adding, to such sludge, materials capable of producing aluminum ions, lime and/or sulfate-bearing compounds to produce a composition containing sulfate ions, aluminum ions and equivalents thereof, and calcium ions and equivalents thereof. Over a period of time such compositions hardened by the formation of calcium sulfo-aluminate hydrates.

Another solution to the problem was said to be provided in U.S. Pat. No. 4,028,240 patented Jun. 7, 1977 by F. Marchak Jr. That patent provided a procedure whereby lime, preferably as calcium oxide, was mixed with the contents of sumps, e.g., oil well sumps. The calcium oxide reacted with the materials present and also dehydrated the contents of the sump, causing the sump contents to stiffen.

Yet another solution to this problem was said to be achieved in U.S. Pat. No. 4,018,679 patented Apr. 19, 1977 by F. Boelsing. That patent provided a method for rendering an oil waste material harmless by mixing an alkaline earth metal oxide with a surface active agent which delayed reaction between the alkaline earth metal oxide and water. The mixture was combined with oily material, e.g., a sludge or an oil-contaminated soil. The alkaline earth metal oxide charged with the waste material was reacted with approximately the stoichiometric amount of water to convert the alkaline earth metal oxide to the hydroxide. The alkaline earth metal oxide was preferably calcium oxide and advantageously it was also mixed with a hydrophobizing agent prior to mixture with the oily waste material.

In the patent to Boelsing described above, the composition used was preferably prepared by blending lime with a solid fatty acid (in particular, a commercial grade of stearic acid commonly called stearic) by slowly adding the acid to coarse lime as it was subjected to the process of fine-grinding. The purpose of this operation was to render the lime hydrophobic, thereby delaying its hydration reaction with water and permitting it to be intimately mixed with contaminated soil by mechanical means. Subsequent hydration then resulted in an extremely fine and uniform dispersion of the contaminants, hydrated lime and soil. In practice, however, the purpose of that invention was not always achieved to its optimum.

Applicant, in co-pending application Ser. No. 07/804,310 filed Dec. 9, 1991, now U.S. Pat. No. 5,290,391, provided a novel hydrophobizing agent which effectively inhibited lime hydration until the lime-water mixture was mechanically blended through vigorous stirring, which was then allowed to remain essentially undisturbed at which time reaction occurs at a high rate. Such hydrophobizing agent was a blend, which was liquid at room temperature and was readily atomizable, of (a) a mixture of liquid saturated fatty acids having from 6 to 12 carbon atoms; with (b) a mixture of glycerides of fatty acids having from 8 to 18 carbon atoms.

That co-pending application also provided a solid mixture which comprised a hydrophobizing agent comprising a mixture of liquid saturated fatty acids having from 6 to 12 carbon atoms with a mixture of glycerides of fatty acids having from 8 to 18 carbon atoms and finely ground lime.

That application also provided a method for preparing the above-described solid mixture by the steps of feeding the above-described hydrophobizing agent to a spray nozzle, and spraying such hydrophobizing agent into a rising air stream carrying the fine lime particles.

That co-pending application was a significant improvement over the prior art in that it provided a liquid blend of certain liquid saturated fatty acids and certain glycerides of fatty acids. The resulting blend was a liquid at room temperature, thereby allowing it to be very easily and uniformly combined with the fine-ground lime. This procedure was accomplished with the aid of a spray nozzle which introduced the hydrophobizing agent into a rising air stream carrying the fine lime particulars.

In spite of such improvement over the prior art, there was still a need to provide a novel method and apparatus for treating hydrocarbon contaminated soils in a manner which would result in the destruction of the hydrocarbon and the fixation and stabilization of all noxious contaminants. Thus, the present Applicant in a second copending application Ser. No. 07/866,472 provided a method for the treatment of hydrocarbon-contaminated soil by chemical hydrolysis and/or oxidation of the hydrocarbons in the hydrocarbon-contaminated soil, the method comprising conditioning lime with a fatty acid hydrophobizing agent, and intimately blending the conditioned lime at a ratio ranging from about 1 to about 6 to about 1 to about 1 with the mass of, preferably moist, contaminated soil having a maximum grain size of less than approximately 5 cm under conditions of high shear. Such conditions of high shear were said to be similar to those obtained with the aid of a concrete mixer, e.g. the one known by the trade-mark NIKKO MIXER, a product of Nikko Co., Ltd. in Tokyo, Japan. The degree of dispersion was said to be at least near microscopic level.

As taught in that copending application Ser. No. 07/866,472, a charge of the blended lime/soil blend was conveyed to an enclosed reaction vessel and hydration of the lime was carried out. The heat of the hydration reaction was retained within the vessel, whereby hydrolysis of the fatty acid conditioner and/or hydrocarbon contaminants in the soil is initiated. Substantially simultaneously, air or oxygen-enriched air was introduced into the reaction vessel together with water in an amount required to satisfy the stoichiometry of the hydrolysis reaction, and/or steam additionally to maintain the temperature of the reacting mixture, thereby to effect a flameless, intermediate-temperature oxidation of the hydrocarbon or the hydrolyzed degradation products of the hydrocarbon. Decontaminated soil product was discharged from the reaction vessel by passing the soil product, in dry, dusty hydrophobic form, through a treating zone where it was sprayed with a surfactant. The surfactant-treated solid was passed to a blender where it was mixed with sufficient water, ranging from about 5% to about 25% based on the quantity of treated solid, to provide a substantially dust-free product.

That invention in that co-pending application Ser. No. 07/866,472 also provided two improvements in the method for the treatment of hydrocarbon-contaminated soil by chemical hydrolysis and/or oxidation of the hydrocarbons in the hydrocarbon-contaminated soil, including subjecting a blend of conditioned lime and hydrocarbon-contaminated soil to a hydrolysis reaction in an enclosed reaction vessel. One improvement included introducing air or oxygen-enriched air into the reaction vessel together with steam and/or water in an amount required to initiate, sustain and complete the hydrolysis/oxidation reaction, thereby to effect a flameless, intermediate-temperature oxidation of the hydrocarbon to their totally degraded products. A second improvement included discharging decontaminated soil product, from the reaction vessel by passing the soil product, in dry, dusty hydrophobic form through a treating zone where it is sprayed with a surfactant. Surfactants suitable for this purpose were said to include aqueous solutions of common commercial and industrial soaps and detergents at concentrations ranging from about 30% to about 80%, and, preferably, aqueous solutions of inorganic alkalis, e.g. sodium hydroxide, at concentrations of about 5% to about 10%.

That co-pending application Ser. No. 07/866,472 also further provided a system for the treatment of hydrocarbon-contaminated soil by chemical hydrolysis and/or oxidation of the hydrocarbons in the hydrocarbon-contaminated soil. The system included means for finely-dividing the hydrocarbon-contaminated soil, a storage hopper, means for feeding the finely-divided, hydrocarbon-contaminated soil to the storage hopper, a blender, means for feeding finely-divided, hydrocarbon-contaminated soil from the storage hopper to the blender, an activated lime storage vessel, means for feeding activated lime from the activated lime storage vessel to the blender, an enclosed inclined reaction vessel, the reaction vessel including a lower inlet, a bottom, air-admitting line, an upper discharge, means within the reaction vessel for moving a solid material charge from the inlet to the discharge, an upper surfactant admitting line at the discharge, discharge means from the blender for feeding a charge of blended lime/soil directly to the reaction vessel, a treating/blending vessel having means for moving a solid charge from an intake to a discharge and an upper water inlet line, discharge means from the reaction vessel for feeding a finely divided decontaminated solid charge directly to the intake of the treating/blending vessel through a spray of surfactant, and discharge means from the treating/blending vessel for discharging moistened decontaminated soil from the treating/blending vessel directly to the central intake of the discharge tower.

Nevertheless, the procedures outlined above did not provide a total answer to the problem of effective treatment of hydrocarbon-contaminated soil.

SUMMARY OF THE INVENTION (i) Aims of the Invention

Accordingly, a principal object of the present invention is to provide a novel method for treating hydrocarbon contaminated soils in a manner which will result in the destruction of the hydrocarbon and the fixation and stabilization of noxious contaminants.

Another object of the present invention is the provision of a method involving blending of the contaminated soil with water and chemically preconditioned lime, whereby, when the resulting mixture is conveyed continuously through a specified system in a controlled environment of oxygen or oxygen enriched air and water or steam, it would be subjected to a sequence of precisely programmed thermal treatments to decontaminate the soil.

(ii) Statements of Invention

The present invention provides a method for the treatment of hydrocarbon-contaminated soil by chemical hydrolysis and/or oxidation of the hydrocarbons in the hydrocarbon-contaminated soil, the method comprising: treating lime with a fatty acid hydrophobizing agent the fatty-acid having from about 6 to about 12 carbon atoms therein. Preheating the treated lime to a temperature of about 50° C. to about 80° C., thereby to provide conditioned lime; intimately blending the conditioned lime in a ratio of from about 1:16 to about 1:1 with physically-preconditioned, moist, hydrocarbon-contaminated soil, under conditions of high shear, the degree of blending being at least near microscopic level; conveying a charge of the blended conditioned lime/soil to an enclosed reaction vessel and carrying out hydration of the conditioned lime in the blended conditioned lime/soil charge; retaining the heat of the hydration reaction within the vessel, whereby hydrolysis of the fatty acid hydrophobizing agent and/or hydrocarbon contaminants in the soil is initiated; substantially simultaneously introducing air, or oxygen-enriched air, into the reaction vessel together with steam or water, thereby to effect a flameless, intermediate-temperature oxidation of the hydrocarbons or of their hydrolysed degradation products; contacting organic by-products and residues of incomplete oxidation as the products of the flameless oxidation step with the conditioned lime/soil bed at a progressively increasing temperature; discharging decontaminated soil product from the reaction vessel by passing the decontaminated soil product, in dry, dusty, hydrophobic form through a treating zone where it may be sprayed with a surfactant; and passing the decontaminated soil product, which may be surfactant-treated to a blender where it is mixed with sufficient water, in an amount ranging from about 5% to about 25% based on the mass of decontaminated soil product, to provide a substantially dust-free product.

(iii) Other Features of the Invention

By one feature of this invention, the hydrocarbon contaminated soil is moist and has a maximum grain size less than about 5 cm.

By yet another feature of this invention, the fatty acid hydrophobizing agent comprises a saturated fatty acid of low-to-moderate carbon chain length and high acid number, e.g., where the liquid fatty acids have from about 6 to about 12 carbon atoms, and where the acid number is about 355 to about 369, and most preferably where the fatty acid hydrophobizing agent comprises a mixture of a preponderant amount of caprylic acid and captic acid.

In one alternative feature of the invention, the method incorporates the step of continuously feeding the blended conditioned lime/soil charge, whereby the blended conditioned lime/soil charge moves slowly through the reaction vessel. In another alternative feature of the invention, the method incorporates the step of batchwise feeding of the blended conditioned lime/soil charge, the blended conditioned lime/soil charge being retained in the reaction vessel for a predetermined period of time e.g., from about 10 to about 45 minutes.

In still another feature of the invention, the direction of flow of the introduced air is co-current to the direction of flow of the blended conditioned lime/soil charge through the reaction vessel.

In yet a further feature of the invention, the surfactant comprises an aqueous solution of sodium hydroxide.

In a still further feature of the invention, the decontamination soil is cooled to a suitable low temperature, e.g., lower than about 100° C., before being sprayed with the surfactant.

In another feature of the invention, the intimate blending is provided by an apparatus capable of imparting sufficient shear and mixing action. The conditions of high shear should be similar to those obtained with the aid of a concrete mixer, e.g. the one known by the trademark NIKKO MIXER, a product of Nikko Co., Ltd. in Tokyo, Japan. The degree of dispersion must be at least near microscopic level.

In a still further feature of the invention, the blender comprises a pug mill.

In another feature of the system of the present invention the means for finely dividing the hydrocarbon-contaminated soil is a jaw crusher or a roll crusher.

(iv) Generalized Description of the Invention

The present invention provides a method that requires all organic constituents, including chlorinated vapours, pyrolysis products, and other solid, liquid and gaseous residues of incomplete oxidation, to pass through a blended conditioned lime/soil bed at progressively increasing temperatures before emerging from the reactor. As a consequence, the complete pyrolysis, dechlorination and ultimate oxidation of the organic components is absolutely assured.

As a consequence of a complex array of chemical reactions, including hydration, hydrolysis, pyrolysis and oxidation, the organic molecules are systematically converted to innocuous residues, e.g., water and carbon dioxide and, depending upon the original composition of the contaminants, a variety of acid gases which are subsequently trapped within the solid mixture as common calcium salts.

The combined impact of, first, limiting the volume of inert gas introduced into the system, then, of attaining dechlorination and decomposition of all organic contaminants and, finally, of scrubbing virtually all toxic or otherwise undesirable reaction products from the vapour phase, is the production of a relatively small quantity of a benign gaseous effluent stream which requires no further attention or treatment.

The present inventive method tends to be largely energy self-sufficient, since all of the reactions, including lime hydration, pyrolysis and oxidation, are rather strongly exothermic. Thus, a significant measure of the energy required to elevate the temperature of the reaction mixture to that required for hydration, pyrolysis and, ultimately oxidation is internally available.

The lime is mixed with the fatty acid in the manner as described in the above-identified co-pending application 07/866,472 of which the present invention is a continuation-in-part. For the sake of completeness, the following additional description is provided herein.

In the interests of optimizing the economics and operational simplicity of the process, a number of single, commercially-available fatty acids were evaluated in the hope that a suitable substitute might be found for the hydrophobizing agent which was a rather costly blend of INDUSTRENE TM 365, and coconut oil which forms the basis of the invention in the two copending patent applications of which the present application is a continuation-in-part. The basis for the comparison was the combined ability of the hydrophobizing agent, when applied at equivalent concentration levels in the range of about 0.5% to about 2.0%, adequately to delay the onset of lime hydration to permit thorough mixing of the lime with the soil and to achieve a comparable final temperature of the mixture at the end of the first, hydration stage of the process.

In fact, it has now been found that a fatty acid hydrophobizing agent, e.g., INDUSTRENE TM 365 alone is sufficient to achieve the desired characteristics, provided that the combined lime and fatty acid is warmed to a temperature in the range of about 50° C. to about 80° C. It has now been found, according to the present invention, that the determining characteristic of the fatty acid hydrophobizing agent is its hydrocarbon chain length, e.g., from $C_6$–$C_{12}$, i.e., from $C_8$–$C_{10}$, and its acid number, e.g., from about 355–369, since these properties determined the extent of masking of the lime particle surface and the rate of water penetration and breakdown of the mask. More specifically, the most desirable combination of fatty acid properties was a saturated molecular structure of low to moderate carbon chain length and a high acid number.

The fatty acid hydrophobizing agent may be a mixture of liquid saturated fatty acids which consists mainly of about 55% caprylic acid and about 42% captic acid by weight, and most preferably consists of: about 1% caproic acid; about 55% caprylic acid; about 42% captic acid and about 2% lauric acid.

In providing the conditioned lime, the amount of the hydrophobizing agent is selected to be sufficient fully to coat the finely divided lime particles. In practice therefore, this would range from about 0.5% to about 2.5% by weight, with the optimum amount being about 1.0%. The size of the finely-divided lime is generally within the range of about minus 10 mesh to sub-micron sizes, preferably about minus 100 to sub-micron sizes.

The preferred method of providing the conditioned lime comprises feeding of the above-described hydrophobizing agent to a spray nozzle, and spraying such hydrophobizing agent into a rising air stream carrying fine lime particles. The pressure gradient across the spray nozzles should be about 10 to about 30 psig. The velocity of upward flow of air is within the range about 50 to about 100 ft/sec.

It has further been found, according to the present invention, that the addition of sodium hydroxide to at least one of the soil and the conditioned lime/soil mixture at levels of up to about 1.0% of the quantity of lime, is effective in regulating the length of the induction period preceding lime hydration.

By the present invention, a novel multi-step method has been provided for the treatment of hydrocarbon-contaminated soil through effective chemical hydrolysis and/or oxidation of the hydrocarbon contaminants. In the first step of the procedure, the lime is conditioned with the fatty acid hydrophobizing agent in accordance with the method described in the above described pending and continuation-in-part applications, then heated to about 50° C. to about 80° C. An appropriate quantity of the thus-conditioned lime, ranging, based on the mass of soil, from about 15% to about 100% as dictated by the quantity of moisture in the feed, the nature of the soil and the type and quantity of the hydrocarbons present and determined through laboratory testing, is intimately blended with physically-preconditioned, moist, hydrocarbon-contaminated soil, which may or may not be further contaminated with noxious heavy metals. While a wide variety of devices capable of imparting the requisite shear and mixing action to the ingredients are commercially available, it is imperative that the degree of dispersion achieved be at the near microscopic level. This provides a blended soil charge.

The blend of conditioned lime/soil is, then, transferred to a reaction vessel in either continuous or batch-wise fashion. If it is fed in a continuous fashion, the blended conditioned lime/soil charge moves slowly through the reactor. If it is fed batchwise, the blended conditioned lime/soil charge is retained for a predetermined period of time which may range from about 10 minutes to about 45 minutes but which is adequate for completion of all hydration, hydrolysis and oxidation reactions. In either procedure, the reactor design is such that the heat generated during the hydration of the lime in accordance with the reaction:

$$CaO + H_2O \rightarrow Ca(OH)_2$$

is contained within the blended conditioned lime/soil charge, thereby causing the temperature to rise to a level at which hydrolysis of the hydrophobizing agent and, possibly certain of the hydrocarbon contaminants, is initiated.

Air, or oxygen-enriched air, combined with water and/or steam where required by the chemical processes, is also introduced into the reactor to effect a flameless, intermediate temperature oxidation of the original hydrocarbons or the hydrolysed degradation products of such hydrocarbons. The air or oxygen enriched air flow rate must be sufficiently high to provide an excess of about 50% to about 100% of the stoichiometric oxygen requirements of the oxidation reactions while being limited to a level which will minimize the heat removal from the reaction mixture. These conflicting requirements may be accommodated through adjustments in the quantity of steam supplied to the reactor and the degree of oxygen enrichment of the air. The oxidation reactions may be represented generically as:

$$C_xH_yO_2 + O_2 \rightarrow CO_2 + H_2O$$

In the continuous method embodiment, the direction of flow of the air and the blended conditioned lime/soil charge in the reactor is co-current. This ensures that any vaporized hydrocarbons, or incompletely hydrolysed/oxidized hydrocarbon degradation products, are carried from the region of high concentration obtaining near the blended conditioned lime/soil charge influent port to a region of low concentration and higher temperature nearer the exit, thereby providing an enhanced opportunity for further reaction.

The decontaminated soil product, which is normally very dry, dusty and extremely hydrophobic, leaves the reactor and, if necessary is precooled, and, also if necessary, then passes through a spray of surfactant en route to another blender (e.g. a conventional pug mill) where it is mixed with a sufficient quantity of water to permit dust-free transfer to the final disposal site and/or compaction into a dense, stable monolith which, upon curing, provides virtually permanent encapsulation of any inorganic or surviving, trace organic residues.

If it is used, the surfactant or wetting agent may be any of a number of commercially available long chain organic molecules, e.g. industrial or domestic soaps and detergents. However, it is preferable that this agent be a solution of about 5% sodium hydroxide in water which is sprayed onto the dry reactor effluent in sufficient volume to ensure the desired water-wetting and compaction qualities of the final product from the process. The actual quantity will be determined by the nature of the soil, the quantity of lime employed, etc. and will range from about 1% to about 10% of the weight of the process product.

According to the present invention, the hydrophobizing agent to condition the lime comprises certain liquid saturated fatty acids, (e.g., coconut oil, babassu oil or palm kernel oil). Since the fatty acids are a liquid at room temperature, they may be very easily and uniformly combined with the fine-ground lime. This procedure is accomplished with the aid of a spray nozzle which introduces the hydrophobizing agent into a rising air stream carrying the fine lime particles. The general composition of fatty acids in coconut oil is as follows: caprylic, about 8.0; capric, about 7.0; lauric, about 48.0; myristic, about 17.5; palmitic, about 8.2; stearic, about 2.0; oleic, about 6.0 and linoleic, about 2.5.

In one preferred coconut oil, the approximate composition of the fatty acids is as follows: lauric acid, about 47%; myristic acid, about 19%; palmitic acid, about 9%; oleic acid, about 7%; stearic acid, about <3% and other (lower molecular weight fatty acids), about >15%.

The approximate composition of fatty acids in babassu oil is as follows: caprylic, about 6.5; captic, about 2.7; lauric, about 45.8; myristic, about 19.9; palmitic, about 6.9; and oleic, about 18.1.

The approximate composition of fatty acids in palm kernel oil is as follows: caprylic, 3.0; captic, about 3.0; lauric, about 52.0; myristic, about 15.0; palmitic, about 7.5; stearic, about 2.5; oleic, about 16.0; and linoleic, about 1.0.

A preferred liquid fatty acid mixture is that known by the trademark INDUSTRENE 365 ™ of Hunko Products Division, National Dairy Products Corporation. A preferred coconut oil is that known by the trademark VICTORY 76 ™ of Bareco Division, Petrolite Corp.

The desired characteristic of the hydrophobizing agent to condition the lime is that it virtually inhibit the lime hydration until the lime is mechanically blended with the contaminated soil with the aid of vigorous stirring, then allowed to remain undisturbed, at which time the reaction should occur at a high rate as indicated by a rapid and extensive rise in temperature. This behaviour is seen to be optimum when the concentration of the hydrophobizing agent in the conditioned lime is within the range of about 0.5% and about 2.5%, with the optimum performance noted at approximately 1.0%.

The hydrophobizing agent also acts as an activator/initiator in the present inventive method for rendering waste substances harmless.

In the novel method of the present invention, as will be described in greater detail hereinafter, at some point during the lime hydration reaction, the hydrophobizing agent begins to react with the conditioned lime. Coupled with the destruction of the lime is the release of sufficient heat to raise the temperature of the mass significantly above about 100° C., the boiling point of water. Temperatures in excess of about 150° C. may be achieved. At this temperature, hydration, which clearly involves water as a reactant, must soon cease and hydrolysis of the conditioned lime takes place. In mixtures of fatty acid conditioned lime (according to the present invention) and hydrocarbon contaminated soil, temperatures in excess of about 400° C. have been observed. In fact, in some instances temperatures may reach as high as about 700° C. Because of these high temperatures, the charge may have to be cooled to a temperature below about 100° C. before, if required, the decontaminated soil is sprayed with the suitable wetting agent, as will be described hereinafter. This behaviour of the hydrophobizing agent as an activator/initiator contributes to the chemical destruction of the hydrocarbon contaminants originally present in the waste soil and is an important mechanism in the operation of the above-described novel method.

BRIEF DESCRIPTION OF THE DRAWINGS

In the accompany drawings.

Figure 1:
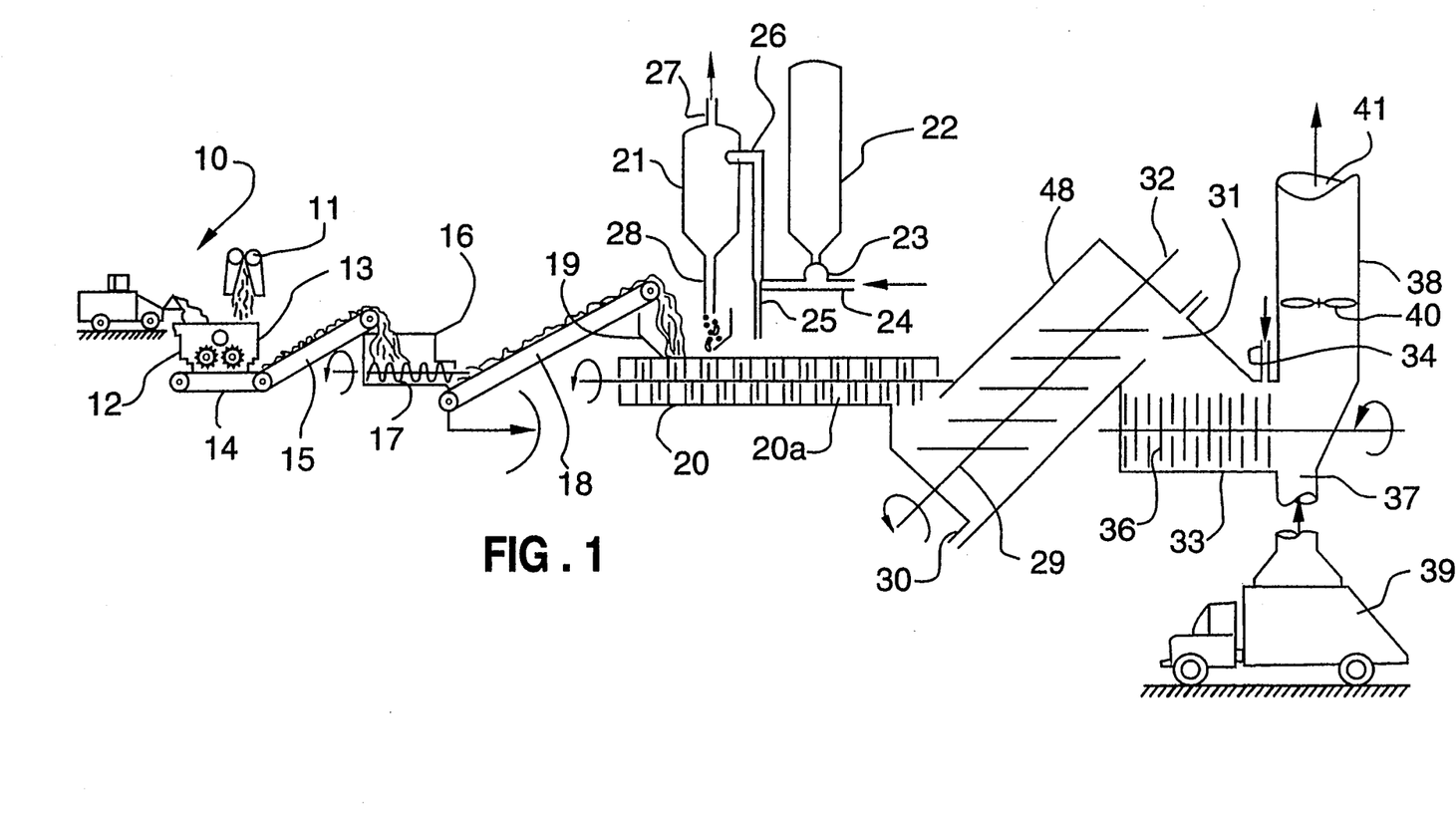
FIG. 1 is a schematic process flow sheet of a system adapted to carry out the method of one embodiment of this invention.

DESCRIPTION OF PREFERRED EMBODIMENT OF SYSTEM (i) Description of FIG. 1

The contaminated soil is removed from the area of contaminants and is fed, by a front-loader 10 either to a jaw crusher 11 or a roll crusher 12 to a hopper 13 provided with a conveyor system 14. Conveyor system 14 feeds an inclined ramp portion 15 leading to a hopper 16 provided with a feed rate control screw soil feeder 17, driven by means (not shown) in the direction shown by the arrow. Screw soil feeder 17 feeds soil to a second weigh-type conveyor system 18 where the soil is fed through a blender hopper 19 to a blender 20 provided with suitable means 20a for blending.

The lime is activated, in the manner previously described, in the activation apparatus 21. Lime is stored in a lime storage vessel 22 where it is fed from a rotary valve 23 at the bottom of the lime storage vessel 22, and is carried by air, supplied through line 24, mixed with fatty acid, and heated, (as previously described) in line 25 to combined inlet line 26 to activated lime storage and feed apparatus 21. Air is exhausted through vent 27. The conditioned lime is discharged via outlet 28 through the blender hopper 19 to the blender 20. From the blender 20, the blended conditioned lime/soil charge is fed to an inclined reactor 48 provided with an upwardly feeding screw conveyor 29 rotated by motor means (not shown) in the direction shown. Oxidizing air together with water and/or steam as determined by the stoichiometry and thermal requirements of the chemical reactions is fed co-currently to the flow of the charge through air inlet 30 to the inclined reactor 48.

At the exit 31 from the inclined reactor 48, the decontaminated soil may be cooled to a suitable low temperature, e.g., lower than about 100° C., and then, if necessary, is sprayed with a suitable wetting agent, as previously described, through spray nozzle 32 and is fed to a pug mill 33. At the pug mill 33, the decontaminated soil is wetted with water through inlet 34, and is discharged by horizontal screw conveyor 36, rotated by motor means (not shown) in the direction shown to the outlet 37 of a discharge tower 38 to a suitable truck 39.

The discharge tower 38 includes an internal fan 40 which forces air outwardly to 41 to a cleanup zone (not shown) and maintains a slight negative pressure in the reactor of approximately 1 cm to 3 cm water vacuum to minimize fugitive emissions.

The decontaminated soil may be fed to a compaction zone (not shown) and/or to landfill.

The following experiments are presented in order to establish the ambit of the method of this invention.

Figure 2:
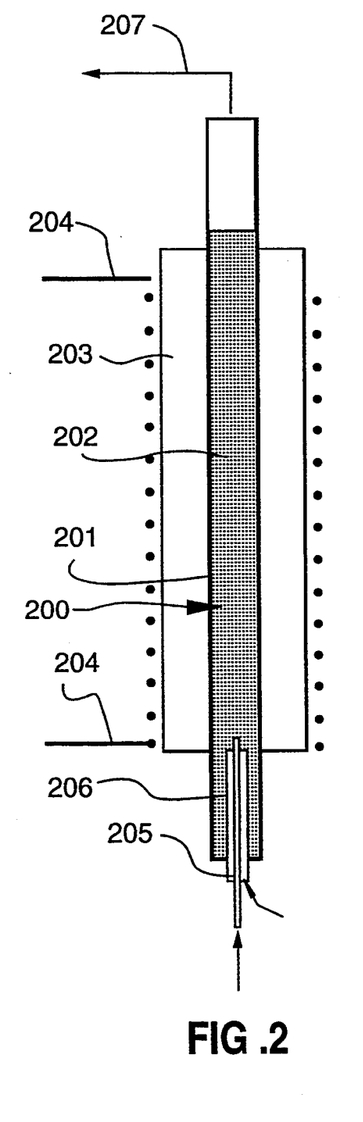
FIG. 2 is a schematic longitudinal section of a laboratory hydrocarbon test furnace.
Figure 3:
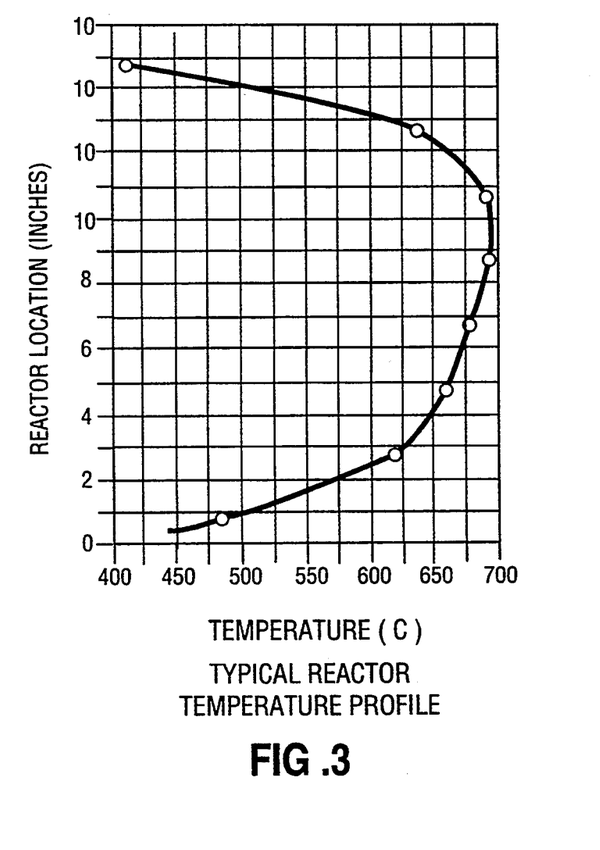
FIG. 3 is a graph showing a typical reactor temperature profile.

EXPERIMENT A—DESTRUCTION OF HYDROCARBONS (ii) Description of FIGS. 2 and 3

A test apparatus for the destruction of hydrocarbons is shown in FIG. 2, where the laboratory furnace 200 includes a tube 201 provided with a soil/lime packing 202, namely lime conditioned with a fatty acid according to the teachings of the present invention. A heating coil 203 is provided surrounding the tube and has electrical lead lines 204 to provide electrical energy to the heating coil 203.

The tube 201 is provided with an oxygen inlet tube 205 and a concentric hydrocarbon inlet tube 206. An outlet tube 207 leads the gas phase to suitable analysis.

The test procedure consisted of the following steps:

a) The 24 inch long by 5/8 inch internal diameter quartz tube reactor was packed with a sufficient charge of a 35% mixture of lime in sandy soil to provide an active (hot zone) bed height of approximately 16 inches.

b) When the reactor attained the desired operating temperatures, as depicted by the typical temperature profile shown in FIG. 3, air, oxygen-enriched air or pure oxygen, at some preselected flow rate between 50 ml per minute and 900 ml per minute, was introduced near the bottom of the packed column.

c) Subsequently, methane, which, like benzene, is extremely refractory to oxidation and displays a high autoignition temperature when compared with other hydrocarbons, was injected into the hot zone of the refractor at approximately 4 inches above the bottom of the column. The flow rates of methane varied from 6 ml per minute to 70 ml per minute, thereby yielding an equivalent inlet gas composition ranging from 2% to 27%. It is noteworthy that the latter figure pertains to an experiment involving this highly combustible blend of methane in pure oxygen. Many other experiments were conducted employing oxygen at similarly high concentrations of methane.

d) Temperature profiles within the reactor were monitored with the aid of a traversing thermocouple throughout the course of the experiment. This procedure permitted both determination of the temperature required to achieve the desired level of oxidation and detection of any points of ignition which invariably signifies the undesirable onset of high temperature combustion.

e) The gas stream emerging from the top of the reactor was transported successively through: (i) a condenser—to cool the gas and to remove the water resulting from the oxidation of the methane, (ii) a calcium chloride dryer—to remove the last traces of water vapour, (iii) a spectroscopic analyzer to determine the residual concentration of any surviving hydrocarbon, and (iv) an oxygen analyzer—to determine and permit control of the excess oxygen level.

f) Gas samples were also taken for chromatographic analysis to monitor any evolution of carbon dioxide and to determine methane residuals when the concentration of this component in the diffluent exceeded the operating range of the spectroscope.

The results of the experiments conducted with this apparatus confirmed that, within the packed bed, a significant degree of non-combustive oxidation of methane was achieved, in air, at temperatures in the order of 570° C. to 590° C. This temperature was progressively reduced to approximately 540° C. as the oxygen concentration of the enriched air was increased toward 100%. Due to methane dilution arising both from its depletion and the production of water vapour by the oxidation reaction, total destruction of the methane was achieved only by increasing the temperature to 700° C. In fact, at this temperature, the quantity of methane surviving the reaction was below the detection limit of 2 ppm to 5 ppm in the effluent stream.

These findings suggests that the ideal reactor would permit manipulation of both the bed temperature and the temperature profile along its length. Prior to depletion of the lime in the upper regions of the static bed, the carbon dioxide formed by the oxidation reaction was absorbed in the form of calcium carbonate and the gas phase concentration was reduced to below detectable levels. Despite the fact that the methane concentrations in the air and/or oxygen feed stream far exceeded the lower explosion limit of this hydrocarbon, no detonation ever occurred in the reactor. This confirmed the inherent stability and safety of the method of the present invention. While it is not desired to be limited to theoretical consideration, it is believed that this extremely desirable characteristic likely arises from the fact that the thermal capacity of the bed material and the very short flame path length between the particles comprising the bed prevents either an unrestrained rate of increase in temperature or the propagation of a flame front.

Figure 4:
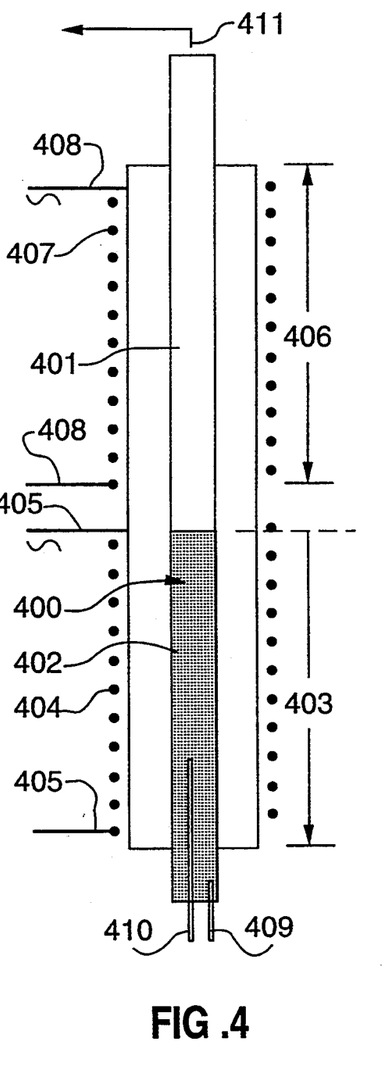
FIG. 4 is a schematic longitudinal section of a laboratory dechlorination furnace.
Figure 5:
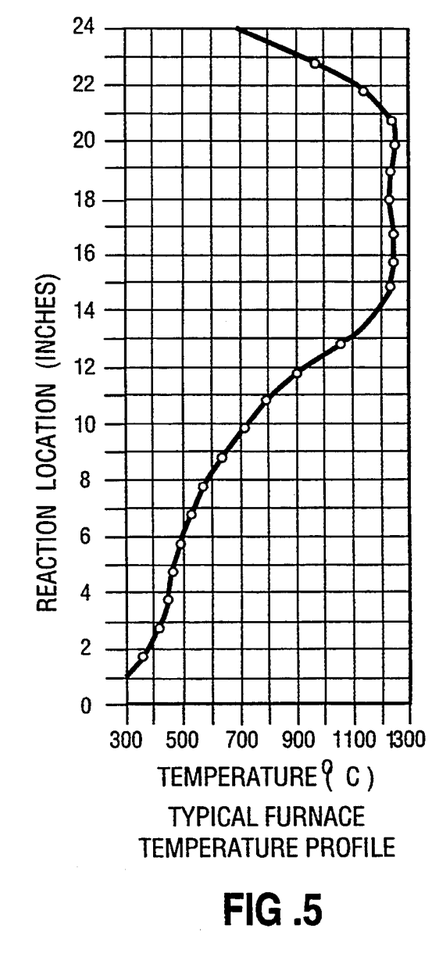
FIG. 5 is a another graph showing a typical furnace temperature profile.

EXPERIMENT B—DESTRUCTION OF CHLORO-ORGANIC COMPOUNDS (iii) Description of FIGS. 4 and 5

The apparatus employed in the performance of these experiments for the destruction of chloro-organic compounds is illustrated in the schematic representation in FIG. 4. As seen in FIG. 4, the test furnace 400 comprises a tube 401 provided with a soil/lime packing 402 in a reactor section 403 which is equivalent to that shown in FIG. 2. A heating coil 404 provided with electric line 405 surrounds the packed part of the tube to provide the reactor section 403. The upper, unpacked part of the tube 401 provides an afterburner section 406. It, too, is provided with a heating coil 407 provided with electrical lead lines 408 to provide electrical energy to the heating coil 407.

An oxygen inlet 409 discharges into a lower portion of packed bed 402, and a chlorinated hydrocarbon inlet 410 discharges into a mid portion of the packed bed 402. An outlet tube 411 leads a gas phase to an absorber.

The reactor consisted of a 30 inch long, 5/8 inch internal diameter alumina tube suspended in a two zone furnace wherein the temperature of each zone was independently controllable. The lower zone was equipped with an oxygen injection port near the base and a chlorinated organic (trichlorobenzene) injection port at point within the heated region. This zone contained lime/soil packing with an active depth of approximately 8 inches and, as illustrated in the graph of FIG. 5, displayed a temperature gradient across its length which increased from 400° C. at the point of injection of the chlorinated organic to 750° C. at the upper extremity of the bed, thereby ensuring immediate vaporization then progressive total destruction of the entering contaminant.

The upper zone of the reactor was maintained at the substantially higher average temperature of approximately 1250° C. This ensured that any chlorinated residues or noxious by-products which might escape from the first zone would encounter temperatures and retention times which, in the oxygen rich atmosphere obtaining, would experience complete oxidation to carbon dioxide, water and hydrogen chloride.

The test procedure consisted of the following steps:

a) Under conditions of a steady oxygen flow rate of 20 ml per minute through the packing, the two zones of the reactor were preheated for the period required to attain an overall constant temperature gradient similar to that exhibited in FIG. 5.

b) A quantity of trichlorobenzene equal to approximately 15% of the mass of active packing in the reaction zone was then injected through the appropriate port at a steady rate of approximately 2 ml per hour with the aid of a syringe pump.

c) The gas stream evolving from the upper zone was conducted through and intimately contacted with a 5% solution of sodium hydroxide to achieve absorption of any hydrogen chloride which had escaped from the reactor bed or the high temperature oxidation zone.

d) Upon completion of the reaction period, the bed material was removed from the reactor column and extracted with water. Since it was reasonably assumed that dechlorination would necessarily result in the production of hydrogen chloride, which would subsequently react with the lime in the bed to form calcium chloride, the extract was then analyzed for chloride ion to determine the extent, if any, of such dechlorination within the lime/soil bed.

e) The sodium hydroxide absorber solution was also examined for the presence of chloride ion to establish the degree to which chlorinated by-products had survived the conditions in the bed.

The several experiments performed with the dual zone reactor confirmed that since no detectable quantity of chloride ion appeared in the sodium hydroxide solution, complete dechlorination of trichlorobenzene was achieved at the temperature levels imposed on the bed. Substantial quantities of soluble chloride ion were extracted from the bed material. However, in the initial tests, the material balance indicated a recovery of only some 70% of the chlorine associated with the injected trichlorobenzene.

It was noted that the temperature at, and for an appreciable distance beyond the point of injection of the trichlorobenzene, while above the boiling point of that compound, was, at 450° C., decidedly below the temperature required for its complete pyrolysis and oxidation. While it is not desired to be limited by theory, it was, therefore, assumed that the missing chloride ion was a reflection of the reformation of some of the trichlorobenzene into high boiling point chloro-organic residues which remained adsorbed to the column packing.

In subsequent tests, the lower zone temperature of the column at the end of the trichlorobenzene injection period was increased to approximately 620° C. in the vicinity of the injection nozzle and maintained at that level for 15 minutes. The subsequent 100% recovery of chloride ion from the packing material both appeared to confirm the foregoing assumption and established the method of the present invention as a viable technique for the destruction of chlorinated organic contaminants.

CONCLUSION

Extensive laboratory studies have confirmed that the process of the present invention is capable of achieving complete destruction of a wide spectrum of hydrocarbon species, ranging from methane to high molecular weight mineral oil distillates, through a combination of hydrolysis, pyrolysis and oxidation. Moreover, provided that appropriate control and discipline of the reaction mechanism is maintained, it is possible to effect this oxidation without incurring the conditions of high temperature normally associated with conventional incineration. More specifically, temperatures in the vicinity of 700° C. have proven to be adequate for the removal of all measurable traces of methane from the gaseous reactor effluent stream. Complete dechlorination and destruction of highly refractory polychlorinated aromatics, e.g., trichlorobenzene (and most likely PCB's) without the production of undesirable polyaromatic dioxin and furan byproducts was achieved. Virtual elimination of noxious chemical emissions, including residual hydrocarbons, chlorine and even carbon dioxide was achieved. Consequently, if the oxidation is accomplished with the aid of relatively pure oxygen, the total gaseous effluent from the process will be minimal, comprising only the nitrogen introduced with the feed, traces of carbon dioxide and uncondensed water vapour.

Due to the relatively low temperatures encountered by the blended conditioned lime/soil charge as it proceeds through the process, the extent of heavy metal vaporization (other than that of mercury) and the degree of nitrogen fixation should be negligible.

The method of the present invention represents a new approach to the remediation of soils and other granulated substrates contaminated with hydrocarbons or other hazardous organic species, e.g., polychlorinated biphenyls, pentachlorophenol and a host of other widespread, durable and pernicious environment pollutants, and comprises a truly viable and attractive alternative to the only current, proven method of choice, namely, incineration.

The unique feature of the present invention, and that which distinguishes it from other, less successful lime-based dechlorination processes, is that, in the prior art processes, the method of heating the contaminated soil/lime mixture and the configuration of these systems invariably caused the organic constituents to be expelled from the reaction zone through evaporation before attaining an adequate duration of exposure to the necessary decomposition temperatures.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A method for the treatment of hydrocarbon-contaminated soil by at least on of chemical hydrolysis and oxidation of said hydrocarbons in said hydrocarbon-contaminated soil, said method comprising:
   a) treating lime with a fatty acid hydrophobizing agent, said fatty-acid having of from about 6 to about 12 carbon atoms therein, and preheating said treated lime to a temperature of about 50° C. to about 80° C. thereby to provide conditioned lime;
   b) intimately blending said conditioned lime, in a ratio of from about 1:16 to about 1:1, with physically-preconditioned moist, hydrocarbon-contaminated soil, under conditions of high shear, the degree of blending being at least near microscopic level, thereby providing blended, conditioned lime/soil;
   c) conveying a charge of said blended conditioned lime/soil to an enclosed reaction vessel and carrying out hydration of said lime in said blended conditioned lime/soil charge;
   d) retaining the heat of said hydration reaction within said vessel, whereby hydrolysis of at least one of said fatty acid hydrophobizing agent and hydrocarbon contaminants in said soil is initiated;
   e) substantially simultaneously introducing at least one of air, and oxygen-enriched air, into said reaction vessel together with at least one of steam and water, thereby to effect a flameless, intermediate-temperature oxidation of at least one of said hydrocarbons and hydrolysed degradation products of said hydrocarbons;
   f) contacting organic constituents and residues of incomplete oxidation as the products of step (e) with said conditioned lime/soil charge at a progressively increasing temperature;
   g) discharging decontaminated soil product from said reaction vessel by passing said decontaminated soil product, in dry, dusty, hydrophobic form through a zone where it may be sprayed with a surfactant, thereby to provide treated decontaminated soil product; and
   h) passing said treated decontaminated soil product from step g) to a blender, where it is mixed with water in an amount ranging from about 5% to about 25, based on the quantity of said treated decontaminated soil product, thereby to provide a substantially dust-free product.

2. The method of claim 1 including the step of incorporating up to about 1% by weight of sodium hydroxide, based on the weight of lime, into said physically-preconditioned, moist, hydrocarbon-contaminated soil.

3. The method claim 1 wherein said hydrocarbon contaminated soil is moist and has a maximum grain size less than about 5 cm.

4. The method of claim 1 including the step of incorporating up to about 1% by weight of sodium hydroxide, based on the weight of lime, into said blended conditioned lime/soil charge.

5. The method of claim 1 wherein said liquid fatty acids have from about 8 to about 10 carbon atoms.

6. The method of claim 5 wherein said liquid fatty-acids have an acid number of about 355 to about 369.

7. The method of claim 1 wherein said acid number is about 355 to about 369.

8. The method of claim 1 wherein said fatty acid hydrophobizing agent comprises a mixture of a preponderant amount of caprylic acid with captic acid.

9. The method of claim 1 wherein said fatty acid hydrophobizing agent is coconut oil.

10. The method of claim 1 wherein said fatty acid hydrophobizing agent is babassu oil.

11. The method of claim 1 wherein said fatty acid hydrophobizing agent is palm kernel oil.

12. The method of claim 1 wherein said method incorporates the step of continuously feeding said blended conditioned lime/soil charge, whereby said blended conditioned lime/soil charge moves through said reaction vessel.

13. The method of claim 12 wherein the direction of flow of said introduced air is co-current to the direction of flow of said blended conditioned lime/soil charge through said reaction vessel.

14. The method of claim 1 wherein said method incorporates the step of batchwise feeding of said blended conditioned lime/soil charge, whereby said blended conditioned lime/soil charge is retained in said reaction vessel for a period of time of from about 10 to about 45 minutes, which is adequate for completion of all hydration, hydrolysis and oxidation reactions.

15. The method of claim 1 wherein said introduced air flows from the point of introduction into the reaction vessel to the point of discharge from the reaction vessel.

16. The method of claim 1 wherein said surfactant, if used, comprises commercial or industrial soaps or detergents at concentration ranging from about 30% to about 80% by weight.

17. The method of claim 16 wherein said surfactant comprises an aqueous solution of sodium hydroxide.

18. The method of claims 17 wherein the concentration of said sodium hydroxide is from about 5% to about 10% by weight.

19. The method of claim 1 including the steps of cooling said decontaminated soil to a temperature below, about 100° C. and then spraying with a surfactant.

20. The method of claim 1 wherein said intimate blending of said conditioned lime/soil charge is provided by a concrete mixer apparatus.

21. The method of claim 20 wherein said apparatus comprises a pug mill.

* * * * *